United States Patent
Zhang et al.

(10) Patent No.: US 9,049,254 B2
(45) Date of Patent: Jun. 2, 2015

(54) CONTROL METHOD, APPARATUS AND SYSTEM

(75) Inventors: Dongfeng Zhang, Shenzhen (CN); Zhenhui Nie, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 567 days.

(21) Appl. No.: 13/238,951

(22) Filed: Sep. 21, 2011

(65) Prior Publication Data

US 2012/0069855 A1 Mar. 22, 2012

(30) Foreign Application Priority Data

Sep. 21, 2010 (CN) .......................... 2010 1 0292336

(51) Int. Cl.
*H04L 12/28* (2006.01)
*H04L 29/08* (2006.01)
*H04L 12/24* (2006.01)
*H04L 12/46* (2006.01)
*H04L 29/06* (2006.01)

(52) U.S. Cl.
CPC ............ *H04L 67/34* (2013.01); *H04L 41/0226* (2013.01); *H04L 29/06136* (2013.01); *H04L 12/4633* (2013.01); *H04L 2212/0025* (2013.01); *H04L 69/32* (2013.01)

(58) Field of Classification Search
None
See application file for complete search history.

(56) References Cited

U.S. PATENT DOCUMENTS

| 6,633,929 | B1 * | 10/2003 | Hyder et al. | 710/62 |
| 6,708,239 | B1 * | 3/2004 | Ellerbrock et al. | 710/62 |
| 7,245,627 | B2 * | 7/2007 | Goldenberg et al. | 370/419 |
| 7,346,026 | B2 * | 3/2008 | Sherman et al. | 370/328 |
| 7,433,913 | B2 * | 10/2008 | Tjong et al. | 709/200 |
| 8,254,903 | B2 * | 8/2012 | Lee | 455/419 |
| 8,396,992 | B2 * | 3/2013 | Lee | 710/5 |
| 2003/0045316 | A1 * | 3/2003 | Tjong et al. | 455/517 |

(Continued)

FOREIGN PATENT DOCUMENTS

| CN | 101499827 A | 8/2009 |
| CN | 101977244 A | 2/2011 |

(Continued)

OTHER PUBLICATIONS

International Search Report and Written Opinion of the International Searching Authority issued in corresponding PCT Patent Application No. PCT/CN2011/079789, mailed Dec. 29, 2011.

(Continued)

*Primary Examiner* — Bob Phunkulh
(74) *Attorney, Agent, or Firm* — Huawei Technologies Co., Ltd.

(57) ABSTRACT

The present invention discloses a control method, an apparatus, and a system. In the embodiments of the present invention, a control command is encapsulated into a network data packet to be sent to a remote network driver interface specification (RNDIS) device, and the encapsulated network data packet is sent to the RNDIS device to control the RNDIS device. In the conventional network architecture, a user device can directly send a network data packet to an RNDIS device. Therefore, with this solution, a control command can be transmitted to the RNDIS device without adding a new control interface. Compared with the solution that requires adding a new interface and installing an additional driver program in the prior art, this solution reduces application complexity and has no special requirement for the RNDIS device, which is commonly applicable and easy to implement.

5 Claims, 8 Drawing Sheets

(56) References Cited

U.S. PATENT DOCUMENTS

| | | | |
|---|---|---|---|
| 2003/0069939 A1* | 4/2003 | Russell | 709/214 |
| 2003/0200315 A1* | 10/2003 | Goldenberg et al. | 709/225 |
| 2004/0054794 A1 | 3/2004 | Lantto et al. | |
| 2004/0125774 A1* | 7/2004 | Hoyt | 370/338 |
| 2005/0105481 A1 | 5/2005 | Gazda et al. | |
| 2005/0105559 A1 | 5/2005 | Cain et al. | |
| 2005/0108571 A1* | 5/2005 | Lu et al. | 713/201 |
| 2005/0125495 A1* | 6/2005 | Tjong et al. | 709/203 |
| 2005/0138214 A1* | 6/2005 | Tjong et al. | 709/250 |
| 2005/0210176 A1 | 9/2005 | Zarns | |
| 2007/0124439 A1 | 5/2007 | Shah et al. | |
| 2008/0089256 A1 | 4/2008 | Chun | |
| 2010/0014459 A1* | 1/2010 | Mir et al. | 370/328 |
| 2010/0197347 A1* | 8/2010 | Lee | 455/558 |
| 2010/0198994 A1* | 8/2010 | Lee | 710/5 |
| 2010/0316021 A1* | 12/2010 | Lerzer et al. | 370/331 |

FOREIGN PATENT DOCUMENTS

| | | |
|---|---|---|
| JP | 2004502345 A | 1/2004 |
| JP | 2005086282 A | 3/2005 |
| JP | 2007516666 A | 6/2007 |
| JP | 2009510546 A | 3/2009 |

OTHER PUBLICATIONS

Office Action issued in corresponding Chinese Patent Application No. 201010292336.1, mailed Dec. 21, 2011.
Extended European Search report issued in corresponding European Patent Application No. 11007687.4, mailed Dec. 15, 2011.
Office Action issued in corresponding Chinese Patent Application No. 201010292336.1, mailed May 3, 2011.
Office Action issued in corresponding Chinese Patent Application No. 201010292336.1, mailed Mar. 26, 2012.

* cited by examiner

CONTROL METHOD, APPARATUS AND SYSTEM

CROSS-REFERENCE TO RELATED APPLICATION

This application claims priority to Chinese Patent Application No. 201010292336.1, filed on Sep. 21, 2010, which is hereby incorporated by reference in its entirety.

FIELD OF THE INVENTION

The present invention relates to the field of communication technologies, and in particular to a control method, an apparatus and a system.

BACKGROUND OF THE INVENTION

The remote network driver interface specification (RNDIS) is a network device specification. It requires an RNDIS device to process the object identifier descriptor (OID) which comes from the system. Therefore, a driver program provided in the system can be used by different RNDIS devices in compatible mode, no dedicated driver program needs to be developed for a specific RNDIS device, and the system can send different OIDs to the RNDIS devices to implement specific functions.

The use of the RNDIS not only brings great convenience to users but also simplifies the development of the RNDIS device. However, RNDIS driver program can only transmit network data, and cannot transmit control commands of users. Therefore, users' basic requests such as dialup and dialup disconnection, cannot be transmitted to the RNDIS device, but can be implemented through other operations only. For example, the network can be disconnected only by means of removing the device, which is inconvenient for users.

To solve this problem, in the prior art, the RNDIS driver is used as an interface of the RNDIS device, and an additional control interface is added in the RNDIS device, where a user device sends a control command through the control interface to control the RNDIS device.

Adding control interface is applicable only to an RNDIS device with a universal serial bus interface rather than to RNDIS devices with all kinds of interfaces. So this solution has no common applicability. In addition, because a new control interface is added, a user needs to add an additional driver program for the new control interface, which increases the complexity of the usage.

SUMMARY OF THE INVENTION

Embodiments of the present invention provide a control method, an apparatus and a system, which not only have common applicability but also can implement the transmission of a control command to an RNDIS device without installing an additional driver program, thereby simplifying usage processes.

A control method includes:

encapsulating a control command into a network data packet to be sent to an RNDIS device, where the control command is used for controlling the RNDIS device; and sending the encapsulated network data packet to the RNDIS device to control the RNDIS device.

A control method includes:

encapsulating a control command into a data packet to be sent to a compact disc (CD) or a human interface device (HID), where the control command is used for controlling an RNDIS device; and sending the encapsulated packet to the RNDIS device through a CD interface or an HID interface set on the RNDIS device to control the RNDIS device.

A control method includes:

receiving a network data packet sent by a user device, where a control command used for controlling an RNDIS device is encapsulated in the data packet;

decapsulating the network data packet to obtain the control command; and performing operations according to the instruction of the control command.

A control method includes:

receiving, through a CD interface or an HID interface set on the RNDIS device, a data packet sent by a user device, where a control command used for controlling an RNDIS device is encapsulated in the data packet;

decapsulating the data packet to obtain the control command; and performing operations according to the instruction of the control command.

A user device includes:

a first encapsulating unit, configured to encapsulate a control command in a network data packet to be sent to an RNDIS device, where the control command is used for controlling the RNDIS device; and a first sending unit, configured to send the network data packet encapsulated by the first encapsulating unit to the RNDIS device to control the RNDIS device.

A user device includes:

a second encapsulating unit, configured to encapsulate a control command into a data packet in the format of CD or HID interface, where the control command is used for controlling an RNDIS device; and a second sending unit, configured to send, through the CD interface or the HID interface set on the RNDIS device, the data packet encapsulated by the second encapsulating unit to the RNDIS device to control the RNDIS device.

An RNDIS device includes:

a first receiving unit, configured to receive a network data packet sent by a user device, where a control command used for controlling the RNDIS device is encapsulated in the data packet;

a first decapsulating unit, configured to decapsulate the network data packet received by the first receiving unit to obtain the control command; and a first processing unit, configured to perform operations according to the instruction of the control command obtained by the first decapsulating unit.

An RNDIS device includes:

a second receiving unit, configured to receive, through a CD interface or an HID interface, a data packet sent by a user device, where a control command used for controlling the RNDIS device is encapsulated in the data packet;

a second decapsulating unit, configured to decapsulate the data packet received by the second receiving unit to obtain the control command; and a second processing unit, configured to perform operations according to the instruction of the control command obtained by the second decapsulating unit.

A communication system includes any user device and any RNDIS device provided by the embodiments of the present invention.

According to embodiments of the present invention, a control command is encapsulated into the network data packet to be sent to the RNDIS device, and the encapsulated network data packet is sent to a RNDIS device to control the RNDIS device. In the conventional network architecture, a user device can directly send a network data packet to an RNDIS device. Therefore, with this solution, a control command can be transmitted to the RNDIS device without adding a new control interface or installing an additional driver program. Compared with the solution which requires adding an additional control interface and installing a driver program in the prior art, this solution reduces application complexity and has no special requirement for the RNDIS device, which is commonly applicable and easy to implement.

BRIEF DESCRIPTION OF THE DRAWINGS

To illustrate technical solutions according to embodiments of the present invention more clearly, accompanying drawings for describing the embodiments are briefly introduced as follows. Apparently, the accompanying drawings describe only some embodiments of the present invention, and persons of ordinary skill in the art can derive other drawings from such accompanying drawings without any creative effort.

DETAILED DESCRIPTION OF THE EMBODIMENTS

Technical solutions according to embodiments of the present invention are elaborated as follows with reference to accompanying drawings. Evidently, the described embodiments are only some rather than all embodiments of the present invention. All other embodiments derived by those of ordinary skill in the art based on the embodiments of the present invention without any creative effort, shall fall within the protection scope of the present invention.

Embodiments of the present invention provide a control method, an apparatus and a system, which are respectively described in detail as follows.

Embodiment 1

This embodiment is described from the aspect of a user device. The user device may be specifically a terminal such as a PC or laptop.

A control method includes: encapsulating a control command used for controlling an RNDIS device into a network data packet to be sent to an RNDIS device; and sending the encapsulated network data packet to the RNDIS device to control the RNDIS device.

Figure 1:
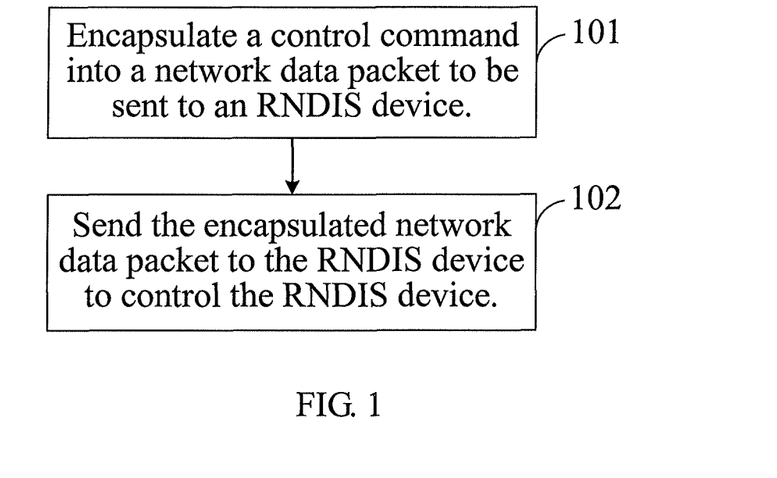
FIG. 1 is a flowchart of a control method according to Embodiment 1 of the present invention.

Referring to FIG. 1, the specific process may be as follows.

101: The control command is encapsulated into the network data packet to be sent to the RNDIS device.

For example, the control command may be encapsulated into a connection-based Transmission Control Protocol (TCP) data packet to be sent to the RNDIS device; or the control command may be encapsulated into a connectionless UDP data packet to be sent to the RNDIS device.

The control command is used for controlling the RNDIS device. The command may be, for example, an AT command, a diagnose (DIAG) command, or other user-defined commands.

102: The encapsulated network data packet is sent to the RNDIS device to control the RNDIS device, for example, to initialize a request for dialing up, unlocking the personal identification number (PIN), or disconnecting the dialup on the RNDIS device.

Optionally, before step 101, i.e., the encapsulating the control command in the network data packet to be sent to the RNDIS device, the process may further includes: creating a network communication port for communicating with the RNDIS device, where the network communication port may be any port, but the port number shall not be the same as those of other known applications. Reference may be made to the prior art for specific creating method, which is not detailed here.

Step 101 may specifically be encapsulating the control command into the network data packet to be sent through the network communication port.

It can be seen from the foregoing description that, according to this embodiment, a control command is encapsulated into a network data packet to be sent to an RNDIS device, and the encapsulated network data packet is sent to the RNDIS device to control the RNDIS device. In the conventional network architecture, a user device can directly send a network data packet to an RNDIS device. Therefore, with this solution, a control command can be transmitted to the RNDIS device without adding a new control interface and installing an additional driver program. Compared with the solution in the prior art, this solution reduces application complexity and has no special requirement for the RNDIS device, which is commonly applicable and easy to implement.

Embodiment 2

This embodiment is described from the aspect of an RNDIS device. The RNDIS device may be specifically a wireless datacard used on an RNDIS port.

A control method includes: receiving a network data packet sent by a user device, where a control command used for controlling an RNDIS device is encapsulated in the network data packet; decapsulating the received network data packet to obtain the control command; and performing operations according to the instruction of the control command.

Figure 2:
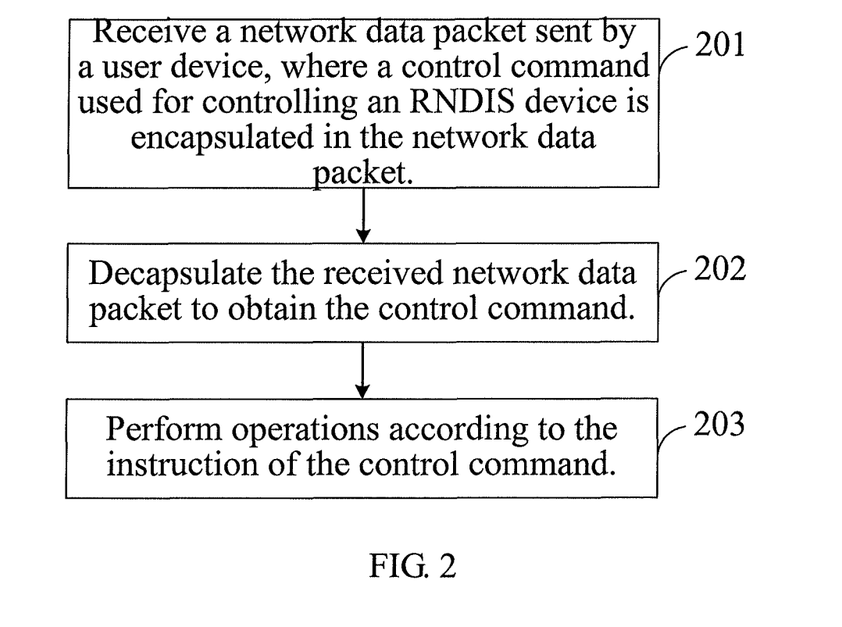
FIG. 2 is a flowchart of a control method according to Embodiment 2 of the present invention.

Referring to FIG. 2, the specific process may be as follows.

201: The network data packet sent by the user device is received, where a control command used for controlling an RNDIS device is encapsulated in the network data packet. The command may be an AT command, a DIAG command, or other user-defined commands.

For example, a connection-based TCP data packet sent by the user device may be received, where the control command used for controlling the RNDIS device is encapsulated in the TCP data packet; or a connectionless UDP data packet is received from the user device, where the control command used for controlling the RNDIS device is encapsulated in the UDP data packet.

Specifically, the network data packet may be received through the network communication port created between the user device and the RNDIS device. The network communication port may be any port, but the port number shall not be the same as that of other known applications.

202: The received network data packet is decapsulated to obtain the control command, which is detailed as follows:

The RNDIS device judges whether the received network data packet carries the control command. If the control command is carried, the network data packet is decapsulated; if the control command is not carried, the RNDIS device determines that the received network data packet is normal network data and sends the data to the network side.

203: Operations are performed according to the instruction of the control command obtained in step 202, for example dialing up, unlocking a PIN, or disconnecting the dialup.

Optionally, the RNDIS device may also return a response message and report the device status change to the system by sending a broadcast data packet.

Figure 3A:
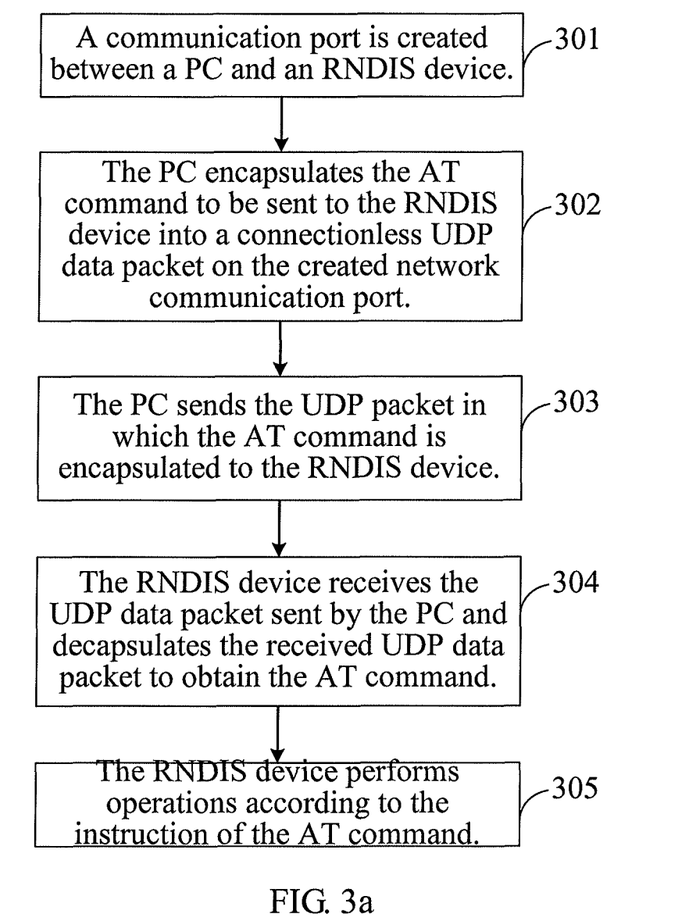
FIG. 3a is a flowchart of a control method according to Embodiment 3 of the present invention.
Figure 3B:
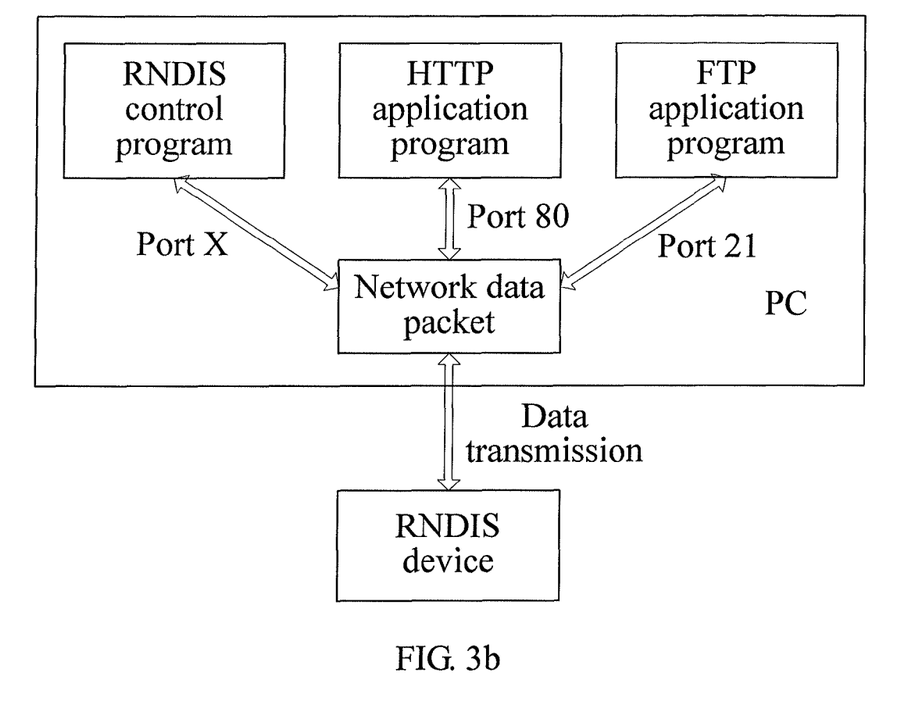
FIG. 3b is a schematic scenario diagram of communication between a personal computer (PC) and an RNDIS device.
Figure 3C:
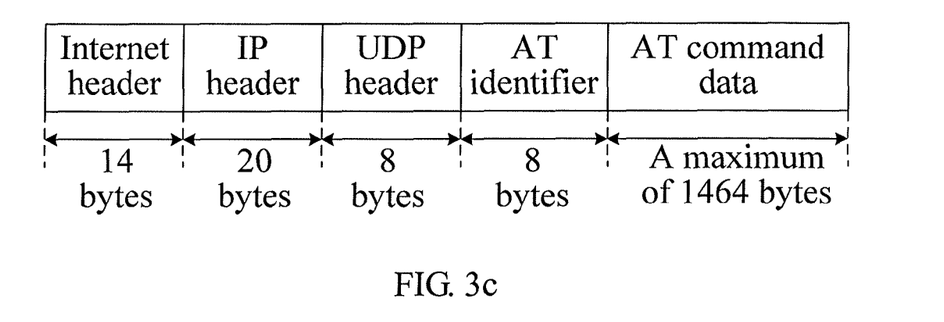
FIG. 3c is a data packet format of using a User Datagram Protocol (UDP) data packet to encapsulate an AT command.

For example, the RNDIS device encapsulates the response message in the format illustrated in FIG. 3c and sends the message to the user device.

It can be seen from the foregoing description that, according to this embodiment, the network data packet sent by the user device is received, where a control command is encapsulated in the network data packet; the network data packet is decapsulated to obtain the control command; and operations are performed according to the instruction of the control command. Thereby, the user device realizes control on the RNDIS device. In the conventional network architecture, a user device can directly send a network data packet to an RNDIS device. Therefore, with this solution, a control command can be transmitted to the RNDIS device without adding a new control interface and installing an additional driver program. Compared with the solution in the prior art, this solution reduces application complexity and has no special requirement for the RNDIS device, which is commonly applicable and easy to implement.

Embodiment 3

According to the methods described in Embodiment 1 and Embodiment 2, the following section uses examples for detailed description.

In this embodiment, an example that the user device is a PC, the network data packet is a connectionless UDP data packet, and the control command is an AT command is taken.

Referring to FIG. 3a, the specific process may be as follows.

301: A network communication port is created between a PC and an RNDIS device, where the network communication port is used for communicating with the RNDIS device, may be any port, but the port number shall not be the same as that of other known applications. For convenience in description, the network communication port is called the port of the RNDIS control program in the embodiments of the present invention.

For example, referring to FIG. 3b, FIG. 3b is a schematic scenario diagram of communication between a PC and a RNDIS device. It can be seen from FIG. 3b that, a port number of a File Transfer Protocol (FTP) application is 21; a port number of a Hypertext Transfer Protocol (HTTP) application is 80. Assume that in the PC, the used port numbers are only 21 and 80, a port X of the RNDIS control program may be any port except ports 21 and 80.

Because the RNDIS device is a network device, an application in the PC may send network data directly to the RNDIS device through the network communication port.

302: On the network communication port created in step 301, a PC needs to issue a user-defined control command to an RNDIS device, for example, AT command is encapsulated into the connectionless UDP data packet.

For example, referring to FIG. 3c, FIG. 3c is a data packet format of using a UDP data packet to encapsulate an AT command. The AT Flag field is the identification filed of the user-defined control command. The size of the field may be set to 8 bytes. An AT command data field is the data field of the user-defined control command. The size of the field is variable, which may be set according to the size of the data. The maximum size of the field may be 1464 bytes.

In the UDP data packet in which an AT command is encapsulated, formats of an Internet header field, an Internet Protocol (IP) header field, and a UDP header field are the same as the conventional UDP data packet format. The size of the Internet header field is 14 bytes, the size of the IP header field is 20 bytes, and the size of the UDP header field is 8 bytes. However, the target media access control (MAC) address of the Internet header needs to use the MAC address or the broadcast address in the RNDIS device to ensure that the UDP data packet can be received by the RNDIS device. In a similar way, the target IP address in IP header also needs to use the address of the IP address or broadcast address of the RNDIS device to ensure that the UDP data packet can be received by the RNDIS device.

303: The PC sends the UDP data packet in which the AT command is encapsulated to the RNDIS device.

304: The RNDIS device receives the UDP data packet sent by the PC, judges whether the UDP data packet carries the AT command, for example, judges whether the AT identifier in the UDP data packet is matched. If the UPD data packet carries the AT command, the received UDP data packet is decapsulated to obtain the AT command. Reference can be made to the prior art for the specific packet decapsulation method, which is not detailed here. If the UDP data packet does not carry the AT command (for example, the AT identifier in the data packet is not matched), it is determined that the UDP data packet is an ordinary UDP data packet, and the RNDIS directly sends the UDP data packet to the network side.

305: The RNDIS device performs operations according to the instruction of the AT command obtained in step 304, for example, dialing up, unlocking a PIN, or disconnecting the dialup.

Optionally, the RNDIS device may respond to the corresponding AT command by responding to the UDP data packet, and report the device status change of the RNDIS device to the PC by sending a broadcast data packet.

It should be noted that the foregoing illustration only uses the case that the network data packet is a connectionless UDP data packet as an example. It should be understood that other network data packets may also be used, for example, a connection-based TCP data packet. Further, the control command may also be a DIAG command or other user-defined commands in addition to the AT command.

It can be seen from the foregoing description that, according to this embodiment, an AT command is encapsulated into a UDP data packet to be sent to an RNDIS device, and the encapsulated UDP data packet is sent to the RNDIS device to control the RNDIS device. In the conventional network architecture, a user device can directly send a UDP data packet to an RNDIS device. Therefore, in this solution, no new control interface needs to be added, and the original interface of the RNDIS device is used. Compared with the solution that requires adding a new control interface in the prior art, this solution facilitates the use of users. Furthermore, with this solution, since no new control interface needs to be added, no additional driver program needs to be installed. Compared with the solution that requires installing an additional driver program in the prior art, this solution reduces application complexity and has no special requirement for the RNDIS device, which is commonly applicable and easy to implement.

Embodiment 4

In addition to the network communication port created between a user device and an RNDIS device, a CD interface or an HID interface may also be added to the RNDIS device for encapsulating and sending a control command. That is, the control command is encapsulated in a CD format or an HID interface format, and is sent to the RNDIS device through the CD interface or HID interface.

Similar to Embodiment 1, this embodiment is also described from the aspect of a user device. The user device may be a terminal device such as a PC or laptop.

Figure 4:
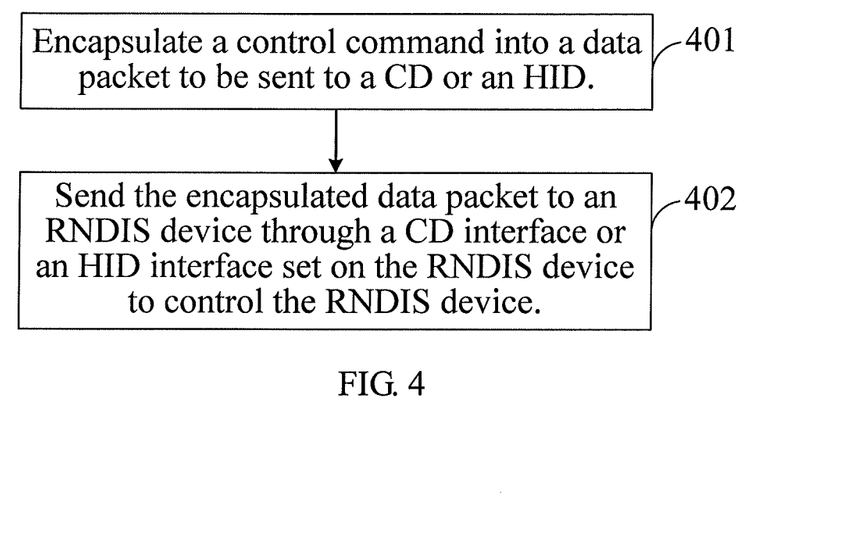
FIG. 4 is a flowchart of a control method according to Embodiment 4 of the present invention.

Referring to FIG. 4, a control method is provided, and the specific process of the method may be as follows.

401: A control command is encapsulated into a data packet in a CD format or an HID interface format.

The control command is used for controlling an RNDIS device. The command may be specifically an AT command, a DIAG command, or other user-defined commands.

402: The encapsulated data packet is sent to the RNDIS device through the CD or HID interface set on the RNDIS device to control the RNDIS device, for example, requesting dialup, unlocking a PIN, or disconnecting the dialup on the RNDIS device.

It can be seen from the foregoing description that, according to this embodiment, a control command is encapsulated into a data packet in a CD format or an HID interface format, and the encapsulated data packet is sent to an RNDIS device through a CD format or an HID interface set on the RNDIS device to control the RNDIS device. Because the conventional PC system includes the universal driver program of the CD interface or the HID device, no additional driver program needs to be installed in this solution. Compared with the solution which require installing an additional driver program in the prior art, this solution reduces the application complexity.

Embodiment 5

Corresponding to Embodiment 4, this embodiment is described from the aspect of an RNDIS device.

Figure 5:
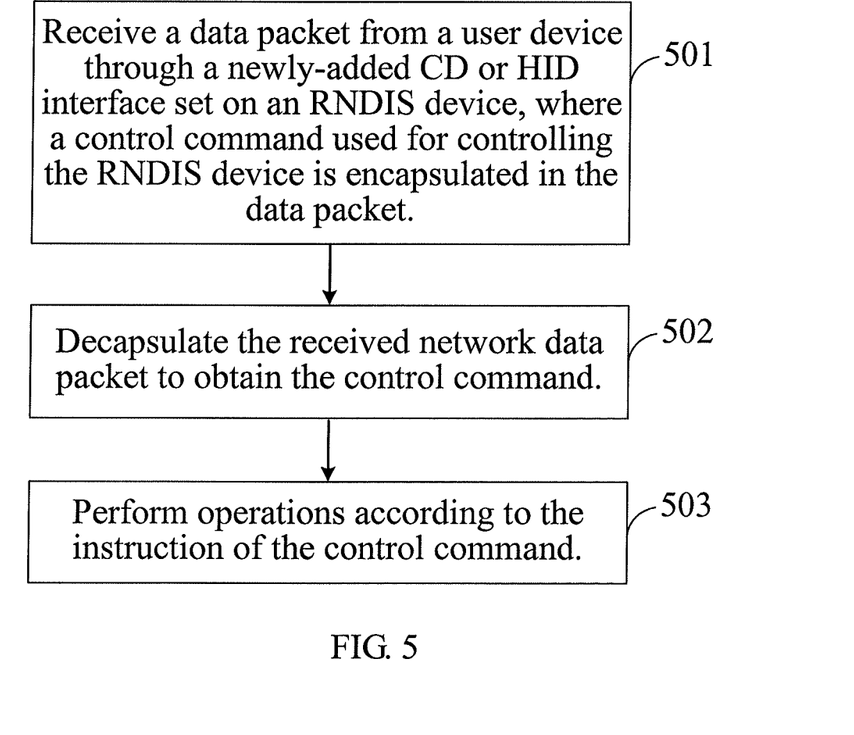
FIG. 5 is a flowchart of a control method according to Embodiment 5 of the present invention.

Referring to FIG. 5, a control method is provided, and the specific process of the method may be as follows.

501: A data packet is received from a user device through a CD interface or an HID interface set on an RNDIS device, where a control command used for controlling the RNDIS device is encapsulated in the data packet.

It should be noted that the data packet here is a data packet in a CD format or an HID interface format.

502: The received data packet is decapsulated to obtain the control command, such as an AT command, a DIAG command, or other user-defined commands. Specifically:

The RNDIS device judges whether the received network data packet carries the control command. If the control command is carried, the network data packet is decapsulated; if the control command is not carried, the RNDIS device judges whether the received data packet is normal data, and processes the data packet according to the prior art.

503: Operations are performed according to the instruction of the control command obtained in step 502, such as dialing up, unlocking a PIN, or disconnecting the dialup.

It can be seed from the foregoing description that, according to this embodiment, a data packet sent by a user device is received through a CD interface or an HID interface, where a control command is encapsulated in the data packet, and the data packet is decapsulated to obtain the control command. Afterwards, operations are performed according to the instruction of the control command. Therefore, the user device realizes control on the RNDIS device. Because the conventional PC system includes the universal driver program of the CD interface or the HID device, no additional driver program needs to be installed in this solution. Compared with the solution which requires installing an additional driver program in the prior art, this solution reduces the application complexity. However, because this solution requires adding an additional interface, compared with the technical solution according to Embodiments 1, 2, and 3, this solution is more complex in implementation.

Embodiment 6

According to the methods described in Embodiment 4 and Embodiment 5, the following section uses examples for detailed description.

Similar to Embodiment 3, in this embodiment, an example that the user device is a PC and the control command is an AT command is also taken. Different from Embodiment 3, in this embodiment, no communication network port is created between a PC and an RNDIS device, but a CD interface or an HID interface is added to the RNDIS device. This solution is mainly applicable to a device supporting an interface to a compositional device, for example, USB device. The following section takes that the user device is a PC and the control command is an AT command as an example for brief illustration.

Figure 6A:
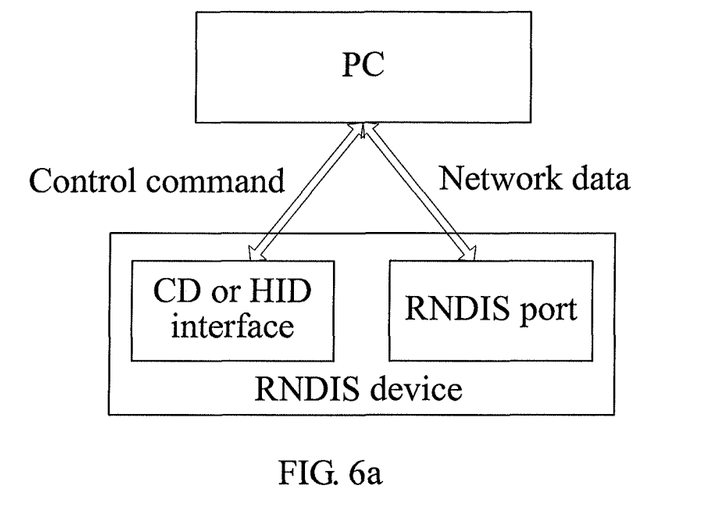
FIG. 6a is a schematic scenario diagram of communication between a PC and an RNDIS device.

First, the CD interface or HID interface needs to be added to the RNDIS device, which is configured to receive a data packet, with which the control command is encapsulated, in a CD format or an HID interface format. However, the original RNDIS port is still used for receiving common data packets. Referring to FIG. 6a, FIG. 6a is a schematic scenario diagram of communication between the PC and the RNDIS device. The PC system already provides the universal driver program for the CD interface or HID device. Therefore, this technical solution requires no additional driver program.

Figure 6B:
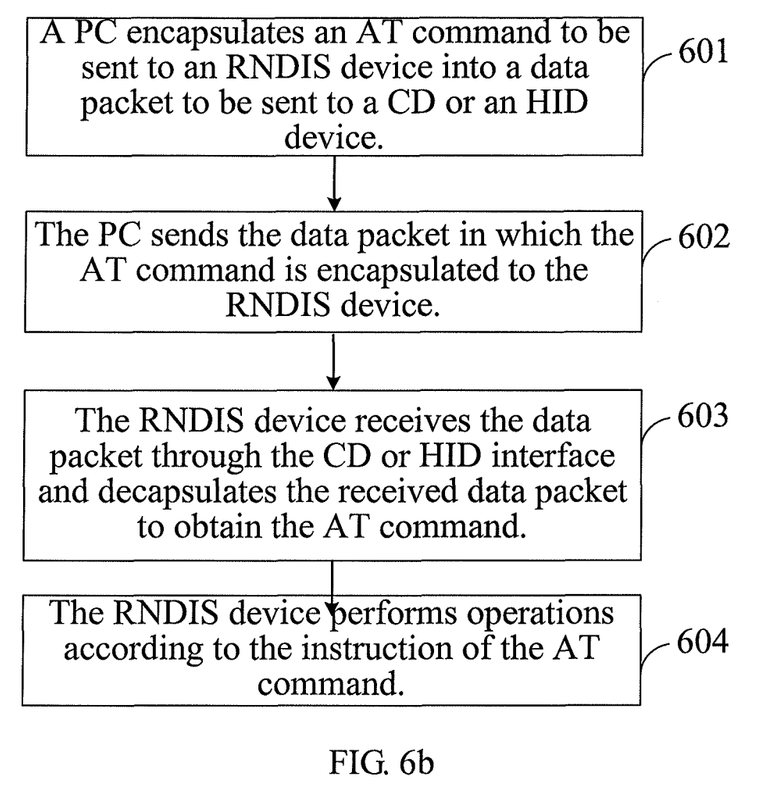
FIG. 6b is a flowchart of the control method according to Embodiment 4 of the present invention.

Referring to FIG. 6b, the specific process may be as follows.

601: The PC encapsulates the user-defined control command, such as an AT command, to be sent to the RNDIS device into the data packet sent to the CD or HID interface

602: The PC sends the data packet, in which the AT command is encapsulated, to the RNDIS device.

603: The RNDIS device receives the data packet sent from the PC through the CD or HID interface, judges whether the data packet carries the AT command, for example, judges whether the AT identifier in the data packet is matched. If the data packet carries the AT command, the received data packet is decapsulated to obtain the AT command. Reference may be made to the prior art for the packet decapsulation method, which is not detailed here. If the data packet does not carry the AT command, for example, the AT command in the data packet is not matched, the data packet is determined to be an ordinary CD or HID data and is processed according to the prior art.

604: The RNDIS device performs operations according to the instruction of the AT command obtained in step 603, for example, dialing up, unlocking the PIN, or disconnecting the dialup.

Optionally, the RNDIS device may respond to the corresponding AT command by responding to the data packet and report the device status change to the PC by sending a broadcast data packet.

It should be noted that the foregoing section only uses the AT command as an example for illustration and it should be understood that other commands may also be used, such as a DIAG command or other user-defined commands.

It can be seen from the foregoing description that, according to this embodiment, an additional CD or HID interface is added on an RNDIS device; an AT command is encapsulated into a data packet to be sent to the RNDIS device, and the encapsulated data packet is sent to the RNDIS device through a CD interface or an HID interface to control the RNDIS device. Because the conventional PC system includes the universal driver program of the CD interface or the HID device, no additional driver programs needs to be installed in this solution. Compared with the solution which require installing an additional driver program in the prior art, this solution reduces the application complexity. However, because this solution requires additional interfaces, it is more complex in implementation as compared with Embodiment 3.

Embodiment 7

Figure 7A:
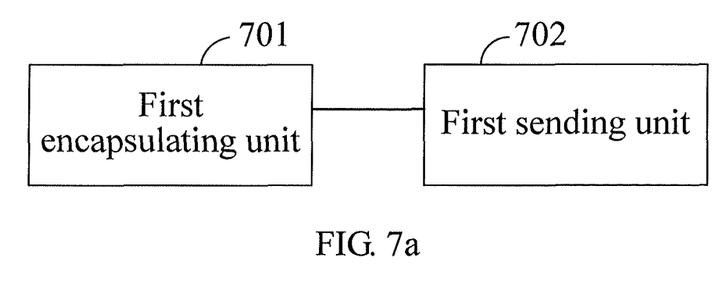
FIG. 7a is a schematic structural diagram of a user device according to an embodiment of the present invention.

For a better implementation of the methods provided in Embodiments 1 to 3, this embodiment of the present invention further provides a user device. As shown in FIG. 7a, the user device includes a first encapsulating unit 701 and a first sending unit 702.

The first encapsulating unit 701 is configured to encapsulate a control command in a network data packet to be sent to an RNDIS device, where the control command is used for controlling the RNDIS device.

The network data packet may be a connection-based TCP data packet or connectionless UDP data packet. The command may be the AT command.

The first sending unit 702 is configured to send the network data packet encapsulated by the first encapsulating unit 701 to the RNDIS device to control the RNDIS device, for example, to initiate a request for dialing up, unlocking a PIN, or disconnecting the dialup on the RNDIS device.

Figure 7B:
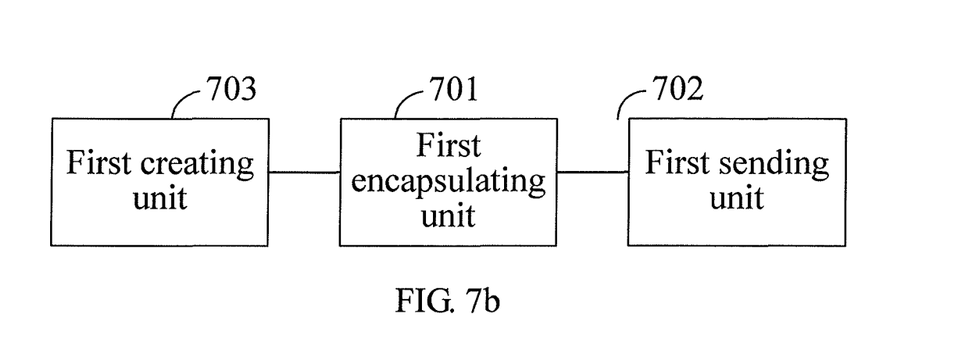
FIG. 7b is another schematic structural diagram of a user device according to an embodiment of the present invention.

Optionally, referring to FIG. 7b, the user device may also include a first creating unit 703.

The first creating unit 703 is configured to create a network communication port for communicating with the RNDIS device. The network communication port may be any port, but the port number shall not be the same as those of other known applications. Reference may be made to the prior art for the creating method, which is not detailed here.

Meanwhile, the first encapsulating unit 701 is specifically configured to encapsulate the control command into the network data packet on the network communication port created by the first creating unit 703.

Optionally, the user device may also include a first receiving unit, configured to receive a response about the control command returned by the RNDIS device and further receive the device status change of the RNDIS device reported by the RNDIS device.

Reference may be made to the foregoing embodiments for the detailed implementation of the units, which is not detailed here.

It can be known from the foregoing description that, in this embodiment, the first encapsulating unit 701 of the user device may encapsulate a control command into a network data packet to be sent to the RNDIS device. Then the first sending unit 702 sends the encapsulated network data packet to the RNDIS device to control the RNDIS device. In the conventional network architecture, a user device can directly send a network data packet to an RNDIS device. Therefore, with this solution, a control command can be transmitted to the RNDIS device without adding a new control interface and installing an additional driver program. Compared with the solution that requires adding a new control interface and installing a driver program additionally in the prior art, this solution reduces application complexity and has no special requirement for the RNDIS device, which is commonly applicable and easy to implement.

Embodiment 8

Figure 8:
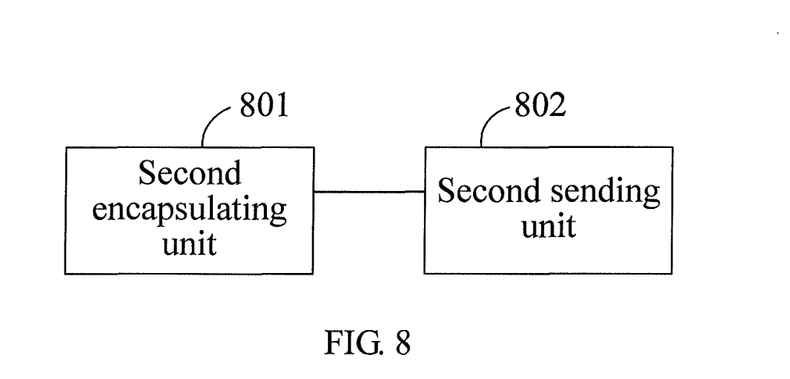
FIG. 8 is yet another schematic structural diagram of a user device according to an embodiment of the present invention.

For a better implementation of the methods provided in Embodiments 4 to 6, this embodiment of the present invention further provides a user device. As shown in FIG. 8, the user device includes a second encapsulating unit 801 and a second sending unit 802.

The second encapsulating unit 801 is configured to encapsulate a control command in a data packet in a CD format or an HID interface format, where the control command is used for controlling an RNDIS device. The command may be an AT command, a DIAG command, or other user-defined commands.

The second sending unit 802 is configured to send the data packet encapsulated by the second encapsulating unit 801 to the RNDIS device through a CD interface or an HID interface arranged on the RNDIS device to control the RNDIS device, for example, to initiate a request for dialing up, unlocking a PIN, or disconnecting the dialup on the RNDIS device.

It can be known from the foregoing description that, the second encapsulating unit 801 of the user device provided in this embodiment encapsulates a control command in a data packet in a CD format or an HID interface format, and the second sending unit 802 sends the data packet to the RNDIS device through the CD or HID interface set on the RNDIS device to control the RNDIS device. Because the conventional PC system includes a universal driver program of the CD interface or the HID device, no additional driver programs needs to be installed in this solution. Compared with the solution which require installing an additional driver program in the prior art, this solution reduces the application complexity.

Embodiment 9

Figure 9:
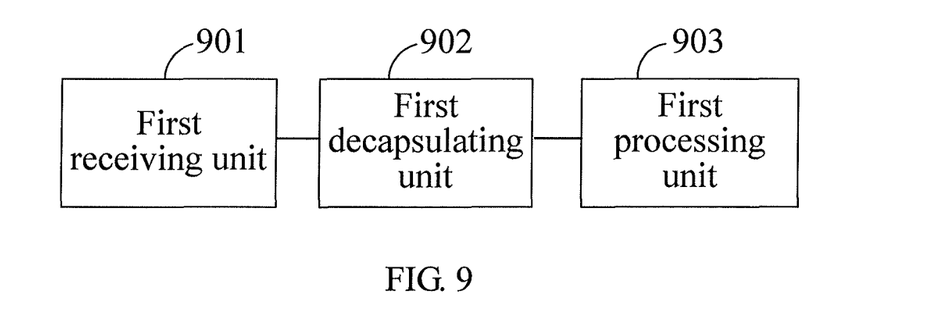
FIG. 9 is a schematic structural diagram of an RNDIS device according to an embodiment of the present invention.

Corresponding to Embodiment 7, this embodiment of the present invention further provides an RNDIS device. As shown in FIG. 9, the RNDIS device includes a first receiving unit 901, a first decapsulating unit 902, and a first processing unit 903.

The first receiving unit 901 is configured to receive a network data packet sent by a user device, where a control command, for example, an AT command, a DIAG command, or other user-defined commands, used for controlling an RNDIS device is encapsulated in the network data packet. The network data packet may be a connection-based TCP data packet or connectionless UDP data packet.

The first decapsulating unit 902 is configured to decapsulate the network data packet received by the first receiving unit 901 to obtain the control command. Reference may be made to the foregoing embodiment for details, which are not detailed here.

The first processing unit 903 is configured to perform operations according to the instruction of the control command obtained by the second decapsulating unit 902, for example, dialing up, unlocking the PIN, or disconnecting the dialup.

The receiving unit 901 is specifically configured to receive the network data packet send by the user device through a network communication port created between the user device and the RNDIS device. The network communication port may be any port, but the port number shall not be the same as those of other known applications.

Optionally, the RNDIS device may also include a first response unit, configured to return a response to the user device. The response unit may further report the device status change to the user device by sending a broadcast data packet.

Reference may be made to the foregoing embodiments for the detailed implementation of the foregoing units, which is not detailed here.

The RNDIS device may be specifically a wireless datacard using an RNDIS port.

It can be known from the foregoing description that, the first receiving unit 901 of the RNDIS device provided in this embodiment can receive a network data packet sent by a user device, where a control command is encapsulated in the network data packet; the first decapsulating unit 902 decapsulates the data packet to obtain the control command; and then the first processing unit 903 performs operations according to the instruction of the control command. Thereby, the user device controls the RNDIS device. In the conventional network architecture, a user device can directly send a network data packet to an RNDIS device. Therefore, with this solution, a control command can be transmitted to the RNDIS device without adding a new control interface or installing an additional driver program. Compared with the solution that requires adding a new control interface and installing a driver program additionally in the prior art, this solution reduces application complexity and has no special requirement for the RNDIS device, which is commonly applicable and easy to implement.

Embodiment 10

Figure 10:
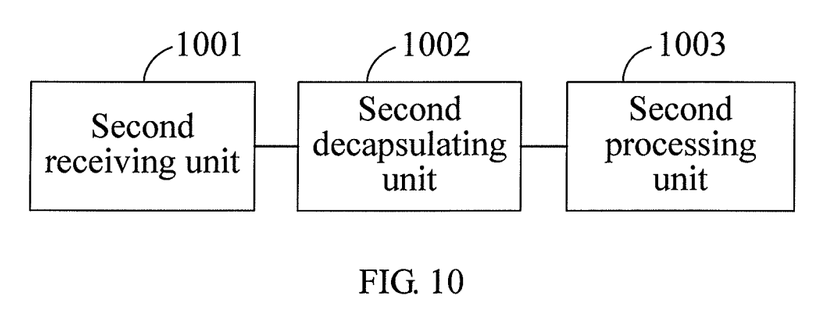
FIG. 10 is another schematic structural diagram of an RNDIS device according to an embodiment of the present invention.

Corresponding to Embodiment 8, this embodiment further provides an RNDIS device. As shown in FIG. 10, the RNDIS device includes a second receiving unit 1001, a second decapsulating unit 1002, and a second processing unit 1003.

The second receiving unit 1001 is configured to receive a data packet from a user device through a CD interface or an HID interface, where a control command used for controlling an RNDIS device is encapsulated in the data packet.

It should be noted that the data packet here is in a CD format or an HID interface format.

The second decapsulating unit 1002 is configured to decapsulate the data packet received by the second receiving unit 1001 to obtain the control command, such as an AT command, a DIAG command, or other user-defined commands. Reference may be made to the foregoing embodiment for details, which are not detailed here.

The second processing unit 1003 is configured to perform operations according to the instruction of the control command obtained by the second decapsulating unit 1002, for example, dialing up, unlocking the PIN, or disconnecting the dialup.

The RNDIS device may be specifically a wireless datacard using an RNDIS port.

It can be known from the foregoing description that, the second receiving unit 1001 of the RNDIS device provided by this embodiment receives the data packet, in which a control command is encapsulated, from a user device through a CD interface or an HID interface; the second decapsulating unit 1002 decapsulates the data packet to obtain the control command; and then the second processing unit 1003 performs operations according to the instruction of the control command. Thereby, the user device controls the RNDIS device. Because the conventional PC system includes a universal driver program of the CD interface or the HID device, no additional driver program needs to be installed in this solution. Compared with the solution which require installing an additional driver program in the prior art, this solution reduces the application complexity.

Embodiment 11

Figure 11:
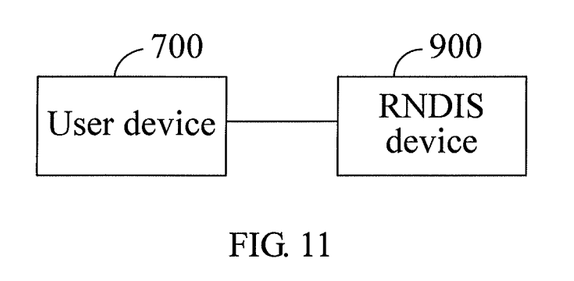
FIG. 11 is a schematic structural diagram of a communication system according to an embodiment of the present invention.

Correspondingly, this embodiment provides a communication system. As shown in FIG. 11, the communication system includes any user device 700 and any RNDIS device 900 provided by the embodiments of the present invention.

The user device 700 is configured to encapsulate a control command into a network data packet to be sent to the RNDIS device 900 or into a data packet in a CD format or an HID interface format, and sends the encapsulated network data packet to the RNDIS device 900, or sends the encapsulated data packet to the RNDIS device through a CD interface or an HID interface set on the RNDIS device, thereby controlling the RNDIS device 900. The control command is used for controlling the RNDIS device 900, and may be an AT command. The network data packet may be specifically a TCP data packet or UDP data packet.

The RNDIS device 900 is configured to receive the network data packet or data packet sent by the user device 700, where the control command used for controlling the RNDIS device 900 is encapsulated in the network data packet or data packet, decapsulates the network data packet or data packet to obtain the control command, and then perform operations according to the instruction of the control command, for example, dialing up, unlocking a PIN, or disconnecting the dialup.

In the specific implementation, optionally, the user device 700 is further configured to create a network communication port for communicating with the RNDIS device 900, and encapsulate the control command into the network data packet on the network communication port. The network communication port may be any port, but the port number shall not be the same as those of other known applications.

Meanwhile, the RNDIS device 900 is specifically configured to receive the network data packet through the network communication port created between the user device and the RNDIS device.

Optionally, the RNDIS device 900 is further configured to return a response message and report the device status change to the system by sending a broadcast data packet.

Meanwhile, the user device 700 is further configured to receive the response message returned by the RNDIS device 900 and report the device status change.

Reference may be made to the foregoing embodiments for the detailed implementation of the foregoing units, which is not detailed here.

It can be seen from the foregoing description that, the user device 700 in the communication system according to this embodiment encapsulates a control command into a network data packet to be sent to the RNDIS device 900, and sends the encapsulated UDP data packet to the RNDIS device 900 to control the RNDIS device 900. In the conventional network architecture, a user device 700 can directly send network data to an RNDIS device 900. Therefore, with this solution, no new control interface needs to be added, but the original interface of the RNDIS device 900 is used. Compared with the solution that requires adding an additional control interface in the prior art, this solution facilitate the use of users. Furthermore, no additional driver program needs to be installed either. Compared with the solution that requires installing an additional driver program in the prior art, this solution reduces application complexity, and further this solution has no special requirement for the RNDIS device 900, which is commonly applicable and easy to implement.

It should be noted that even in this embodiment of the present invention, an additional CD or HID interface may be added to create a control channel. However, the conventional system of the user device 700 already includes universal driver programs for the CD or HID interface. Therefore, this solution requires no additional driver programs, which also reduces the application complexity as compared with the solution requires installing an additional driver program in the prior art.

It is understandable to those of ordinary skill in the art that all or part steps of the foregoing embodiments can be implemented by a program instructing hardware. The program may be stored in a computer readable storage medium. The storage medium may be a read only memory (ROM), a random access memory (RAM), a magnetic disk or a compact disc.

The foregoing gives a detailed introduction to a control method, an apparatus and a system according to the embodiments of the present invention. The principle and implementation of the present invention are expatiated in this application through specific embodiments, which are used only to facilitate the understanding of the method and core idea of the present invention. Meanwhile, those of ordinary skill in the art can make modifications and variations to the invention according to the idea of the present invention in terms of specific implementations and the scope of the invention. In conclusion, this specification shall not be construed as a limitation to the present invention.

What is claimed is:

1. A control method performed by a user device, comprising:
    encapsulating, by the user device, a control command into a network data packet to be sent to a remote network driver interface specification (RNDIS) device, wherein the control command is configured to control the RNDIS device to dial up or disconnect a dialup; and
    sending, by the user device, the encapsulated network data packet to the RNDIS device;
    wherein the control command is an AT command, the network data packet is a UDP data packet, a format of the UDP data packet in which the AT command is encapsulated comprises an Internet header field, an Internet Protocol header field, a UDP field header field, an AT identifier field and an AT command data field, wherein:
    the AT identifier field is an identification filed of a user-defined control command, the AT command data field is a data field of the user-defined control command, a target media access control address in the Internet header field is a MAC address or a broadcast address of the RNDIS device, a target IP address in the Internet Protocol header field is an IP address or the broadcast address of the RNDIS device.

2. The method according to claim 1, wherein the step of encapsulating the control command into the network data packet comprises:
    encapsulating, by the user device, the control command into a connection-based Transmission Control Protocol (TCP) data packet to be sent to the RNDIS device; or
    encapsulating, by the user device, the control command into a connectionless User Datagram Protocol (UDP) data packet to be sent to the RNDIS device.

3. A control method performed by a remote network driver interface specification (RNDIS) device, comprising:
    receiving, by the RNDIS device, a network data packet, wherein the network data packet is sent by a user device, wherein a control command is encapsulated in the network data packet, wherein the control command is configured to control the RNDIS device to dial up or disconnect a dialup
    decapsulating, by the RNDIS device, the network data packet to obtain the control command; and
    performing, by the RNDIS device, an operation to dial up or disconnect a dialup according to the instruction of the control command;
    wherein the control command is an AT command, the network data packet is a UDP data packet, a format of the UDP data packet in which the AT command is encapsulated comprises an Internet header field, an Internet Protocol header field, a UDP field header field, an AT identifier field and an AT command data field, wherein:
    the AT identifier field is an identification filed of a user-defined control command, the AT command data field is a data field of the user-defined control command, a target media access control address in the Internet header field is a MAC address or a broadcast address of the RNDIS device, a target IP address in the Internet Protocol header field is an IP address or the broadcast address of the RNDIS device.

4. A user device, comprising:
    a first encapsulating unit, configured to encapsulate a control command in a network data packet to be sent to a remote network driver interface specification (RNDIS) device, wherein the control command is configured to control the RNDIS device to dial up or disconnect a dialup; and
    a first sending unit, configured to send the network data packet to the RNDIS device;
    wherein the control command is an AT command, the network data packet is a UDP data packet, a format of the UDP data packet in which the AT command is encapsulated comprises an Internet header field, an Internet Protocol header field, a UDP field header field, an AT identifier field and an AT command data field, wherein:
    the AT identifier field is an identification filed of a user-defined control command, the AT command data field is a data field of the user-defined control command, a target media access control address in the Internet header field is a MAC address or a broadcast address of the RNDIS device, a target IP address in the Internet Protocol header field is an IP address or the broadcast address of the RNDIS device.

5. A remote network driver interface specification (RNDIS) device, comprising:
- a first receiving unit, configured to receive a network data packet wherein the network data packet is sent by a user device, wherein a control command is encapsulated in the network data packet, wherein the control command is configured to control the RNDIS device to dial up or disconnect a dialup;
- a first decapsulating unit, configured to decapsulate the network data packet received by the first receiving unit to obtain the control command; and
- a first processing unit, configured to perform an operation to dial up or disconnect a dialup according to the instruction of the control command obtained by the first decapsulating unit;
- wherein the control command is an AT command, the network data packet is a UDP data packet, a format of the UDP data packet in which the AT command is encapsulated comprises an Internet header field, an Internet Protocol header field, a UDP field header field, an AT identifier field and an AT command data field, wherein:
- the AT identifier field is an identification filed of a user-defined control command, the AT command data field is a data field of the user-defined control command, a target media access control address in the Internet header field is a MAC address or a broadcast address of the RNDIS device, a target IP address in the Internet Protocol header field is an IP address or the broadcast address of the RNDIS device.

* * * * *

UNITED STATES PATENT AND TRADEMARK OFFICE
CERTIFICATE OF CORRECTION

PATENT NO. : 9,049,254 B2  
APPLICATION NO. : 13/238951  
DATED : June 2, 2015  
INVENTOR(S) : Dongfeng Zhang et al.

Page 1 of 1

It is certified that error appears in the above-identified patent and that said Letters Patent is hereby corrected as shown below:

On the Title page, (73) Assignee: delete "Huawei Technologies Co., Ltd. (Shenzhen, CN)" and insert --Huawei Device Co., Ltd. (CN)--.

Signed and Sealed this  
Twenty-seventh Day of October, 2015

Michelle K. Lee  
*Director of the United States Patent and Trademark Office*